(12) United States Patent
Kumar KN et al.

(10) Patent No.: US 10,503,668 B2
(45) Date of Patent: Dec. 10, 2019

(54) INTELLIGENT FIELD INPUT/OUTPUT (I/O) TERMINAL FOR INDUSTRIAL CONTROL AND RELATED SYSTEM AND METHOD

(71) Applicant: Honeywell International Inc., Morris Plains, NJ (US)

(72) Inventors: Dinesh Kumar KN, Bangalore (IN); Paul F. McLaughlin, Ambler, PA (US); Paul Gerhart, Huntsville, AL (US); Jethro Francis Steinman, Haverford, PA (US); Sai Krishnan Jagannathan, Bangalore (IN); Amol Kinage, Bangalore (IN)

(73) Assignee: Honeywell International Inc., Morris Plains, NJ (US)

(*) Notice: Subject to any disclaimer, the term of this patent is extended or adjusted under 35 U.S.C. 154(b) by 11 days.

(21) Appl. No.: 15/448,219

(22) Filed: Mar. 2, 2017

(65) Prior Publication Data
US 2018/0107609 A1    Apr. 19, 2018

Related U.S. Application Data

(60) Provisional application No. 62/409,800, filed on Oct. 18, 2016.

(51) Int. Cl.
*G06F 13/10* (2006.01)
*G06F 13/20* (2006.01)
(Continued)

(52) U.S. Cl.
CPC ............ *G06F 13/102* (2013.01); *G06F 8/61* (2013.01); *G06F 8/654* (2018.02); *G06F 9/4406* (2013.01);
(Continued)

(58) Field of Classification Search
CPC ...... G06F 13/102; G06F 9/4406; G06F 13/20; G06F 13/42; G06F 21/575
(Continued)

(56) References Cited

U.S. PATENT DOCUMENTS

| | | | | | |
|---|---|---|---|---|---|
| 3,588,831 | A | * | 6/1971 | Figueron | G06F 13/122 710/5 |
| 3,675,209 | A | * | 7/1972 | Trost | G06F 13/124 710/5 |

(Continued)

FOREIGN PATENT DOCUMENTS

EP    0147702 A2    7/1985

*Primary Examiner* — Paul R. Myers

(57) ABSTRACT

A device includes multiple communication interfaces configured to send and receive data over multiple communication paths. The device also includes multiple input/output (I/O) channels configured to communicate with multiple field devices. The device further includes at least one processing device configured to process at least some of the data and control at least one of the field devices based on the processed data. The device may also include an intrinsic safety barrier electrically separating the communication interfaces and the I/O channels. The communication interfaces may include at least one first interface configured to communicate over one or more first communication paths with at least one component of an industrial control system and at least one second interface configured to communicate over one or more second communication paths with at least one other device that is configured to communicate with additional field devices.

21 Claims, 9 Drawing Sheets

(51) Int. Cl.
- *G06F 13/42* (2006.01)
- *G06F 9/4401* (2018.01)
- *G06F 8/61* (2018.01)
- *G06F 8/654* (2018.01)
- *G06F 21/57* (2013.01)

(52) U.S. Cl.
CPC .............. *G06F 13/20* (2013.01); *G06F 13/42* (2013.01); *G06F 21/575* (2013.01)

(58) Field of Classification Search
USPC .......................................................... 710/8
See application file for complete search history.

(56) References Cited

U.S. PATENT DOCUMENTS

| | | | |
|---|---|---|---|
| 5,761,518 A * | 6/1998 | Boehling | G05B 19/0421 700/82 |
| 6,038,516 A * | 3/2000 | Alexander | H02H 3/04 702/67 |
| 6,446,202 B1 * | 9/2002 | Krivoshein | G05B 19/0421 700/1 |
| 6,896,536 B1 | 5/2005 | Nguyen et al. | |
| 7,412,548 B2 | 8/2008 | Sichner | |
| 7,757,276 B1 * | 7/2010 | Lear | H04L 63/126 726/10 |
| 9,252,507 B2 | 2/2016 | Nagasaki et al. | |
| 9,252,513 B2 | 2/2016 | Masuda et al. | |
| 9,263,809 B2 | 2/2016 | Assif et al. | |
| 9,628,065 B2 * | 4/2017 | Law | H03K 17/002 |
| 9,836,426 B2 * | 12/2017 | Zou | G06F 8/654 |
| 9,861,002 B1 * | 1/2018 | Tenorio | H05K 5/0286 |
| 9,872,411 B2 * | 1/2018 | Lv | H05K 7/1468 |
| 9,946,613 B2 * | 4/2018 | Goto | G06F 11/2007 |
| 2002/0111948 A1 * | 8/2002 | Nixon | G05B 19/4145 |
| 2002/0150156 A1 * | 10/2002 | Calvin | G01D 21/00 375/238 |
| 2003/0236937 A1 * | 12/2003 | Barros De Almeida | H04L 12/5692 710/305 |
| 2004/0153594 A1 * | 8/2004 | Rotvold | G05B 19/4186 710/305 |
| 2005/0066104 A1 * | 3/2005 | Train | G05B 19/4186 710/305 |
| 2005/0186857 A1 * | 8/2005 | Sichner | H01R 13/514 439/717 |
| 2007/0198224 A1 * | 8/2007 | McGuire | H01Q 1/084 702/188 |
| 2009/0327684 A1 * | 12/2009 | Zimmer | G06F 21/575 713/2 |
| 2010/0077111 A1 * | 3/2010 | Holmes | H04L 12/40013 710/33 |
| 2011/0131455 A1 * | 6/2011 | Law | H04B 3/548 714/40 |
| 2013/0223494 A1 * | 8/2013 | Jensen | G01M 3/184 375/224 |
| 2014/0122754 A1 * | 5/2014 | Gutermuth | G05B 19/054 710/104 |
| 2014/0239923 A1 * | 8/2014 | Alley | G05B 9/03 323/234 |
| 2015/0278144 A1 * | 10/2015 | McLaughlin | G06F 13/4027 710/104 |
| 2018/0101156 A1 * | 4/2018 | Kumar KN | G05B 19/0425 |

* cited by examiner

INTELLIGENT FIELD INPUT/OUTPUT (I/O) TERMINAL FOR INDUSTRIAL CONTROL AND RELATED SYSTEM AND METHOD

CROSS-REFERENCE TO RELATED APPLICATION AND PRIORITY CLAIM

This application claims priority under 35 U.S.C. § 119(e) to U.S. Provisional Patent Application No. 62/409,800 filed on Oct. 18, 2016. This provisional application is hereby incorporated by reference in its entirety.

TECHNICAL FIELD

This disclosure relates generally to industrial process control and automation systems. More specifically, this disclosure relates to an intelligent field input/output (I/O) terminal for industrial control and a related system and method. Even more specifically, this disclosure relates to a field installable module (FIM) capable of performing functions such as control, input/output, communication, and safety functions.

BACKGROUND

Existing process control and automation systems for industrial facilities often have several hardware components participating in control and input/output (I/O) functions that are installed in a control room. The systems in a control room typically gather I/O information from the field. The systems in the control room also typically perform control functions and transmit outputs back to the field. Thus, the conventional topology operates in a gather-scatter mode, where input data is gathered from multiple locations and output data is scattered to multiple locations. Unfortunately, this topology makes it expensive and limits substantial improvements in control performance.

The existing systems have many challenges. These challenges could include a higher cost of cabling because every I/O function often requires a pair of cables to a field device, which is expensive and may result in additional costs for junction boxes, labor, and long-term maintenance. Also, each critical I/O function may require an intrinsically safe (IS) barrier. The higher the number of critical I/O functions, the higher the number of IS barriers. Moreover, the more cables and IS barriers used, the higher the physical footprint of the system. In addition, as the numbers of cables and IS barriers increase, the total cost of ownership and complexity of maintenance increases.

SUMMARY

This disclosure is directed to an intelligent field input/output (I/O) terminal for industrial control and a related system and method.

In a first embodiment, a device includes multiple communication interfaces configured to send and receive data over multiple communication paths. The device also includes multiple I/O channels configured to communicate with multiple field devices. The device further includes at least one processing device configured to process at least some of the data and control at least one of the field devices based on the processed data.

In a second embodiment, a system includes a controller configured to control at least part of one or more industrial processes and at least one field device. The system also includes an enclosure having (i) a first field installable module configured as a gateway that is configured to communicate with the controller over a network and (ii) a second field installable module configured to communicate with the first field installable device and to control the at least one field device.

In a third embodiment, a method includes communicating with multiple field devices associated with an industrial control system using multiple I/O channels of a first field installable module. The method also includes communicating with a supervisory process controller or a human-machine interface using a first communication interface of the first field installable module. The method further includes communicating with a second field installable module using at least one of the first communication interface and a second communication interface of the first field installable module. In addition, the method includes controlling at least one of the field devices based on data received over at least one of the communication interfaces.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As described above, existing process control and automation systems for industrial facilities often have several hardware components participating in control and input/output (I/O) functions that are installed in a control room. Existing systems often have large physical footprints due at least partially to the number of intrinsically safe (IS) barriers used and the amount of cabling needed between the hardware in a control room and devices in the field.

In order to improve control performance and reduce costs, this disclosure is directed to devices and systems that combine multiple functions (such as control, I/O, communication, and safety barrier) into a single enclosed device. Control functions may include regulatory, discrete, sequence, and/or user-supplied logic. The control functions may also include alarm functions, sequence of event (SOE) functions, and other control-related functions.

The device may act as a building block for process control and automation systems. For example, the device may ensure seamless scalability to fit small, medium, and large customer applications. The device may also be weatherresistant or weather-proof, thereby permitting the device to be installed in the field and coupled to a control room over a network.

In some embodiments, the device could have a miniature form factor and support multiple I/O channels with device level control, single loop integrity, and peer-to-peer communication. The device could also support an integrated IS barrier, include a dust-free enclosure, and be Internet Protocol (IP) enabled. In particular embodiments, the device could support four or more universal input/output (UIO) channels. The device may be designed for outdoor applications to avoid the need for expensive customer cabinet solutions. The device may be used with traditional I/O wiring and distributed control system (DCS) organizations, as well as in an original equipment manufacturer (OEM) relationship with dedicated equipment and skids. This permits the device to be installed in remote/modular/skid applications, junction boxes, or similar structures that might already exist in the field. The device may also be designed to be used as a standalone module. The device may support multiple physical layers (such as for both wired and wireless communications) and may support multiple communication protocols.

Figure 1:
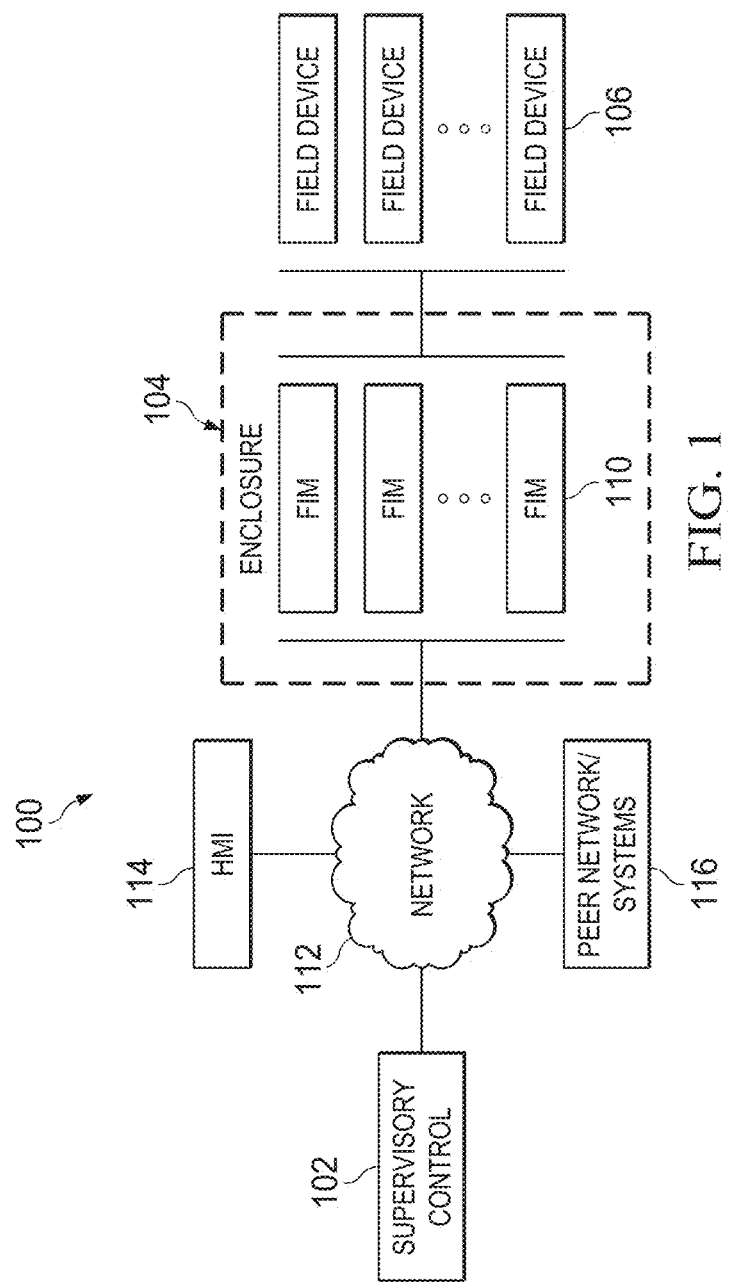
FIG. 1 illustrates an example control system according to this disclosure.

FIG. 1 illustrates an example control system 100 according to this disclosure. The control system 100 can be used to control at least part of an industrial plant or other industrial facility. In some embodiments, the system 100 is used to control field devices located in one or more hazardous areas.

As shown in FIG. 1, the system 100 includes a supervisory controller 102, a field enclosure 104, one or more field devices 106, one or more Human Machine Interfaces (HMIs) 114, and one or more peer networks or systems 116. The controller 102 generally operates to collect information associated with the field devices 106. For example, the controller 102 could execute one or more applications stored thereon or otherwise accessible by the controller 102. The application(s) can be used to perform supervisory control functions on the field devices 106. The controller 102 denotes any suitable structure facilitating the collection, analysis, and output of data, such as a computer. The HMIs 114 are used to facilitate interactions with human operators associated with the system 100. The HMIs 114 may include devices such as operator stations, consoles, or input devices. The peer networks/systems 116 may include other systems similar to the control system 100 as part of an overall process control and automation system.

The field enclosure 104 may be located in the field and includes one or more field installable modules (FIMs) 110. The enclosure 104 can be a field junction box, a marshaling cabinet, a remote equipment enclosure, an intrinsic barrier enclosure, or a control system cabinet in a control room. Each FIM 110 generally operates as an I/O device (and possibly a UIO device) and provides control signals to one or more of the field devices 106. Each FIM 110 may interface with other peer FIMs over a multi-drop communication channel. Each FIM 110 can also be configured to operate as a gateway or data aggregator and communicate with one or more of the supervisory controller 102, HMIs 114, and networks/systems 116 over a network 112 (such as an Ethernet or other wired network or an IEEE 802.11b/g/n/ac or other wireless network). Each FIM 110 is enclosed in a mechanical enclosure that may be compliant with an Ingress Protection standard (such as IP65) or other standard, thereby permitting outdoor use of the FIM 110. Additional details regarding the structures and operations of the FIM 110 are provided below. Note that these structures and operations relate to specific implementations of the FIM 110 and that other implementations of the FIM 110 could also be used.

Each field device 106 represents any device that is remotely monitored or controlled, such as due to its location. For example, a field device 106 may be located in a hazardous environment, which would not permit a user to monitor the device without a remote monitoring system. Each field device 106 denotes any suitable structure for collecting data or receiving control commands to perform a corresponding action. Example field devices 106 can include sensors, actuators, or control devices such as programmable logic controllers (PLCs).

Although FIG. 1 illustrates one example of a control system 100, various changes may be made to FIG. 1. For example, the control system 100 could include any number of each component. Also, industrial control and automation systems come in a wide variety of configurations. The system 100 shown in FIG. 1 is meant to illustrate one example operational environment in which certain functionalities can be used. However, FIG. 1 does not limit this disclosure to any particular configuration or operational environment.

FIGS. 2A through 3B illustrate example field enclosures 104 for use in a control system according to this disclosure. For ease of explanation, the field enclosures 104 may be described as operating in the system 100 of FIG. 1. However, the field enclosures 104 could be used in any other suitable control system.

Figure 2A:
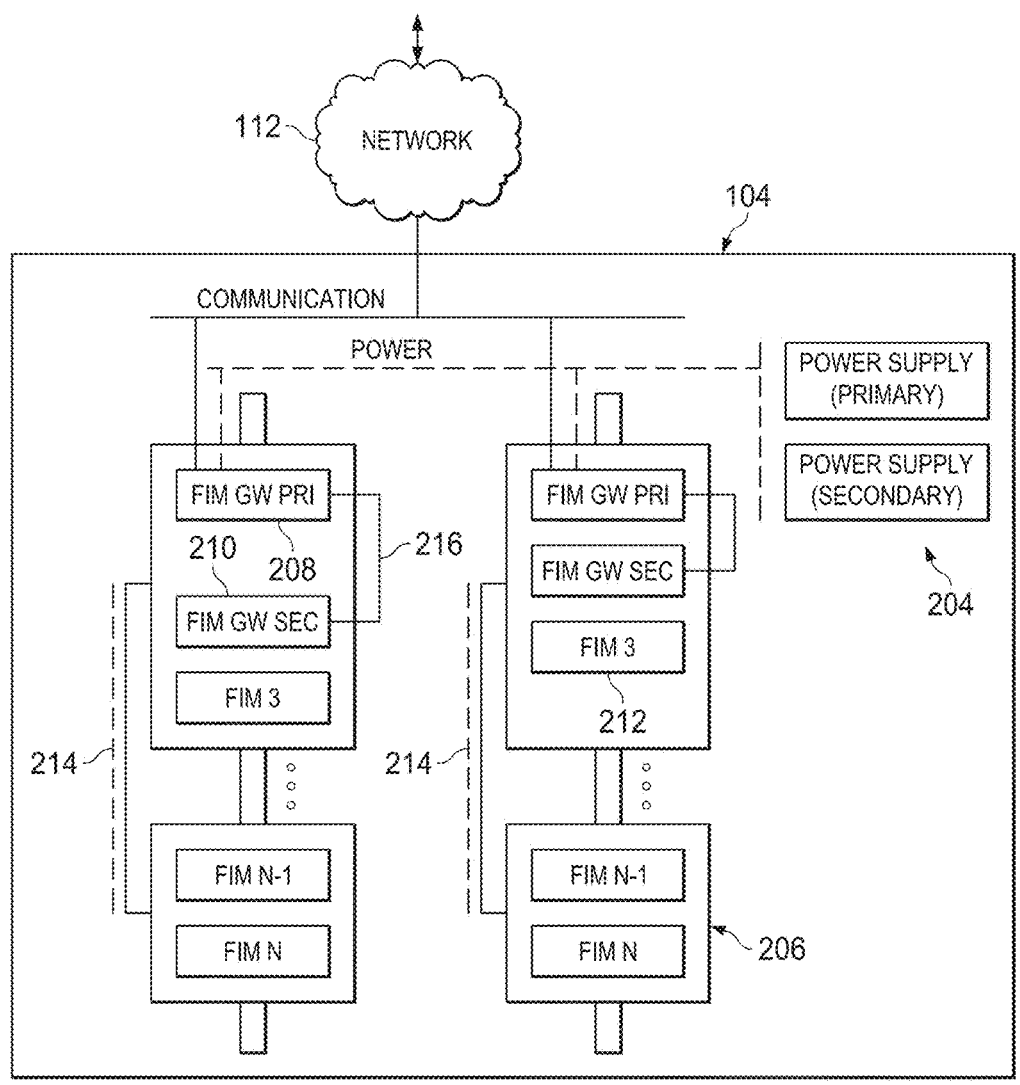
FIGS. 2A through 3B illustrate example field enclosures for use in a control system according to this disclosure.

As shown in FIG. 2A, one implementation of the field enclosure 104 includes at least one power supply 204 and a number of FIM carriers 206. In this example, the power supply 204 includes a primary supply and a secondary supply. The primary supply could operate to provide power to other components of the field enclosure 104, and the secondary supply could provide power to the other components in the event of a failure involving the primary supply. Note, however, that a single power supply or more than two power supplies could be used.

Each FIM carrier 206 is configured to receive one or more FIMs 212, and one or multiple FIM carriers 206 can be used to hold a set of up to n FIMs 212. In some instances, a first FIM disposed on a FIM carrier 206 can be configured to function as a primary gateway module 208, and a second FIM disposed on a FIM carrier 206 can be configured to function as a secondary gateway module 210 in case the primary gateway module 208 fails. The primary and secondary gateway modules 208 and 210 are communicatively coupled to each other via a private communication path 216, such as an Ethernet connection. The primary and secondary gateway modules 208 and 210 also communicate over the network 112 (such as via Ethernet) with one or more of the supervisory controllers 102, HMIs 114, and peer networks/systems 116.

The FIMs 212 disposed on the FIM carriers 206 (including the gateway modules 208 and 210) communicate with each other via a physical communication standard, such as a multipoint low-voltage differential signal (M-LVDS) standard. For example, as shown in FIG. 2A, each FIM 212 may have two signal lines 214, where each signal line 214 communicates with multiple FIMs 212 disposed on multiple FIM carriers 206. Each signal line 214 may include redundant power and communication lines. In some embodiments, the signal lines 214 could be at least partially implemented as printed circuit board (PCB) tracks on the FIM carriers 206.

Figure 2B:
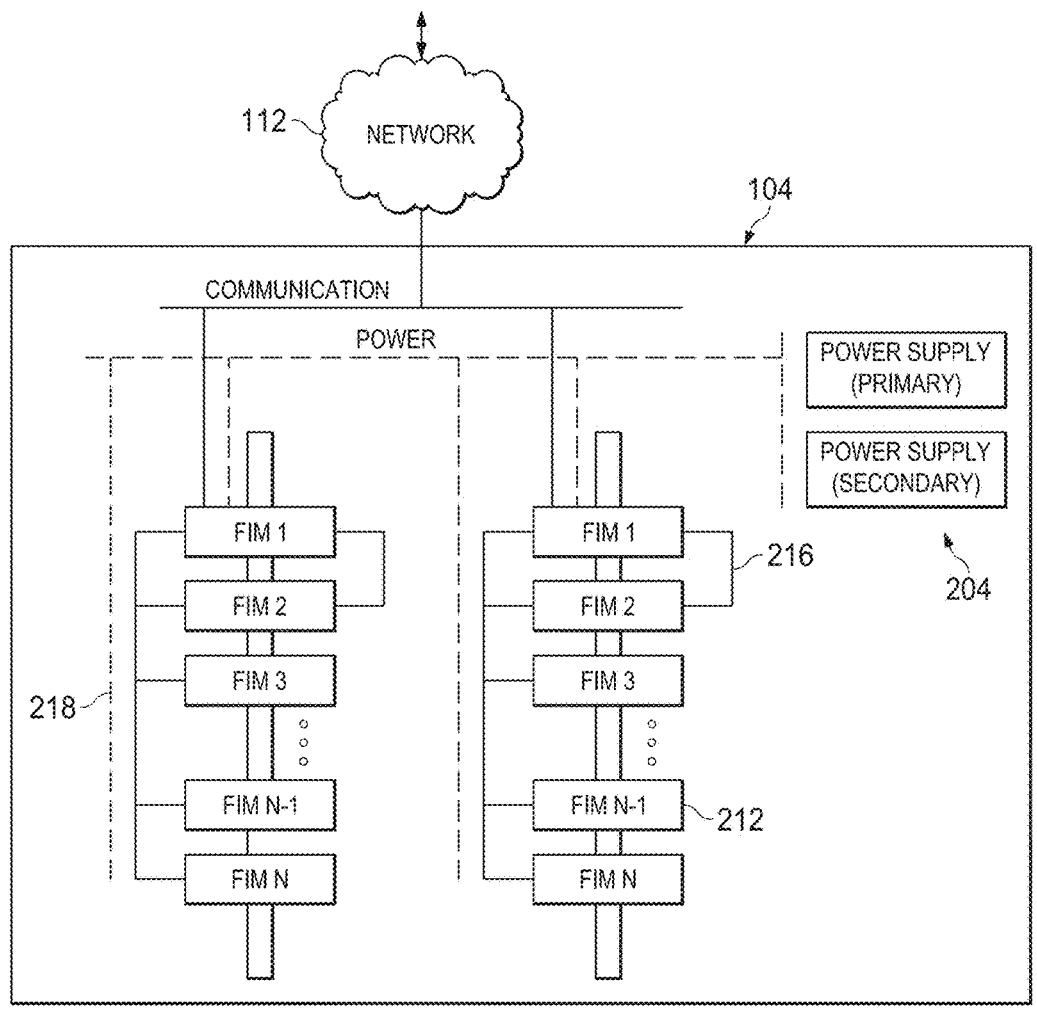

In some embodiments, the field enclosure 104 may incorporate any suitable structure such that the FIM carriers 206 can be DIN RAIL mounted, wall mounted, panel mounted, or otherwise mounted to the field enclosure 104. In contrast, as shown in FIG. 2B, the field enclosure 104 may incorporate any suitable structure such that the FIMs 212 can be DIN RAIL mounted, wall mounted, panel mounted, or otherwise mounted directly to the field enclosure 104 without the use of the FIM carriers 206. In this configuration, signal lines 218 between the FIMs 212 may be used in place of the signal lines 214, and the signal lines 218 could be made through physical cables.

Figure 3A:
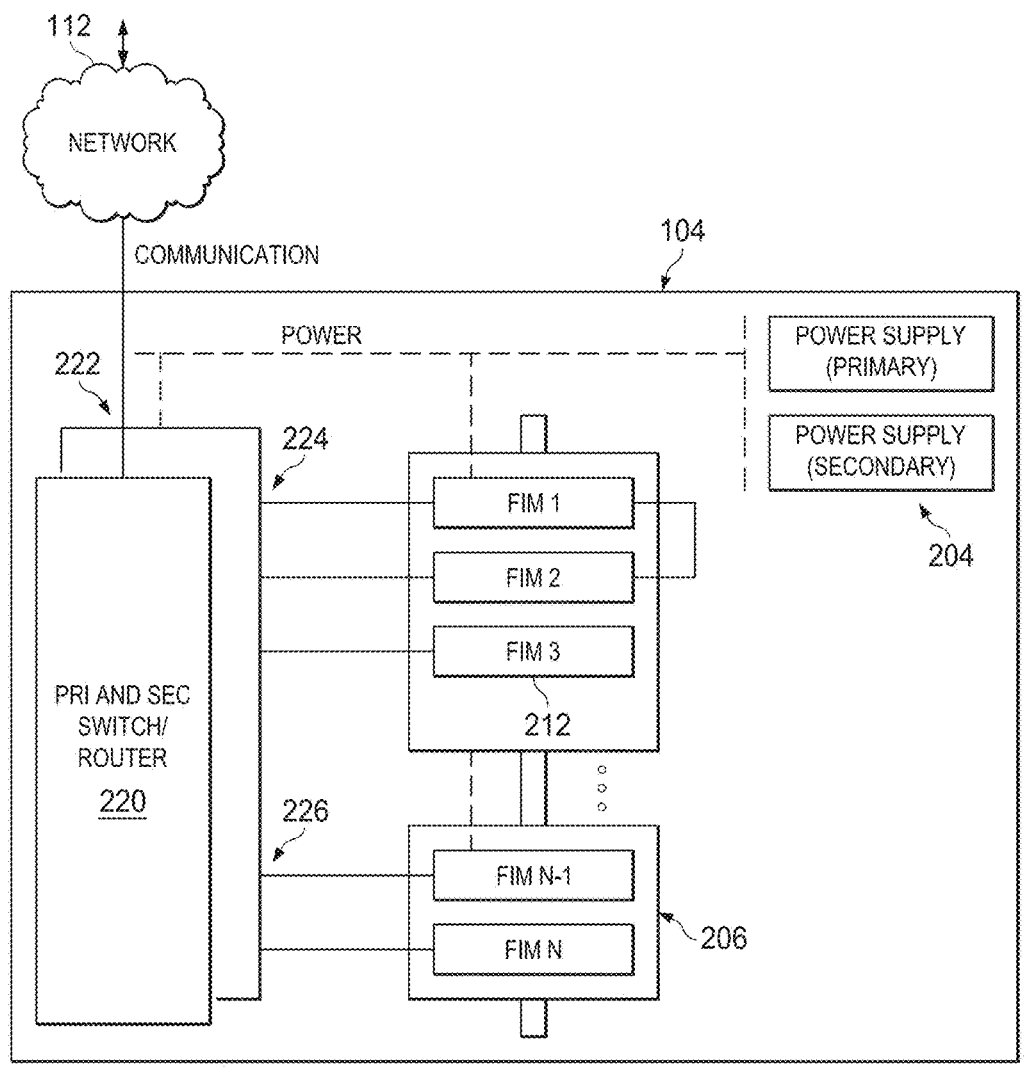

As shown in FIG. 3A, another implementation of the field enclosure 104 includes the power supply 204, the FIM carriers 206, and the FIMs 212. Rather than using certain FIMs 212 as primary and secondary gateway modules, this implementation of the field enclosure 104 includes at least one network routing device, such as a switch or router 220. In some embodiments, the field enclosure 104 includes primary and secondary switches or routers 220 to support redundant operation.

Each network routing device has one or more upstream ports 222 and multiple downstream ports 224. The upstream port 222 of each network routing device is configured to communicate over the network 112 (such as via Ethernet) with one or more of the supervisory controllers 102, HMIs 114, and peer networks/systems 116. Each downstream port 224 of the network routing device is interfaced with one of the FIMs 212 disposed on one of the FIM carriers 206, such as via Ethernet.

Each FIM 212 disposed on a FIM carrier 206 communicates with other FIMs 212 and the external network 112 through at least one signal line 226 coupled to the network routing device(s). In some embodiments, each FIM 212 may have two signal lines 226, where each signal line 226 supports communications with multiple FIMs 212 disposed on multiple FIM carriers 206 through the network routing device(s). The signal lines 226 could be at least partially implemented as PCB tracks on the FIM carriers 206.

Figure 3B:
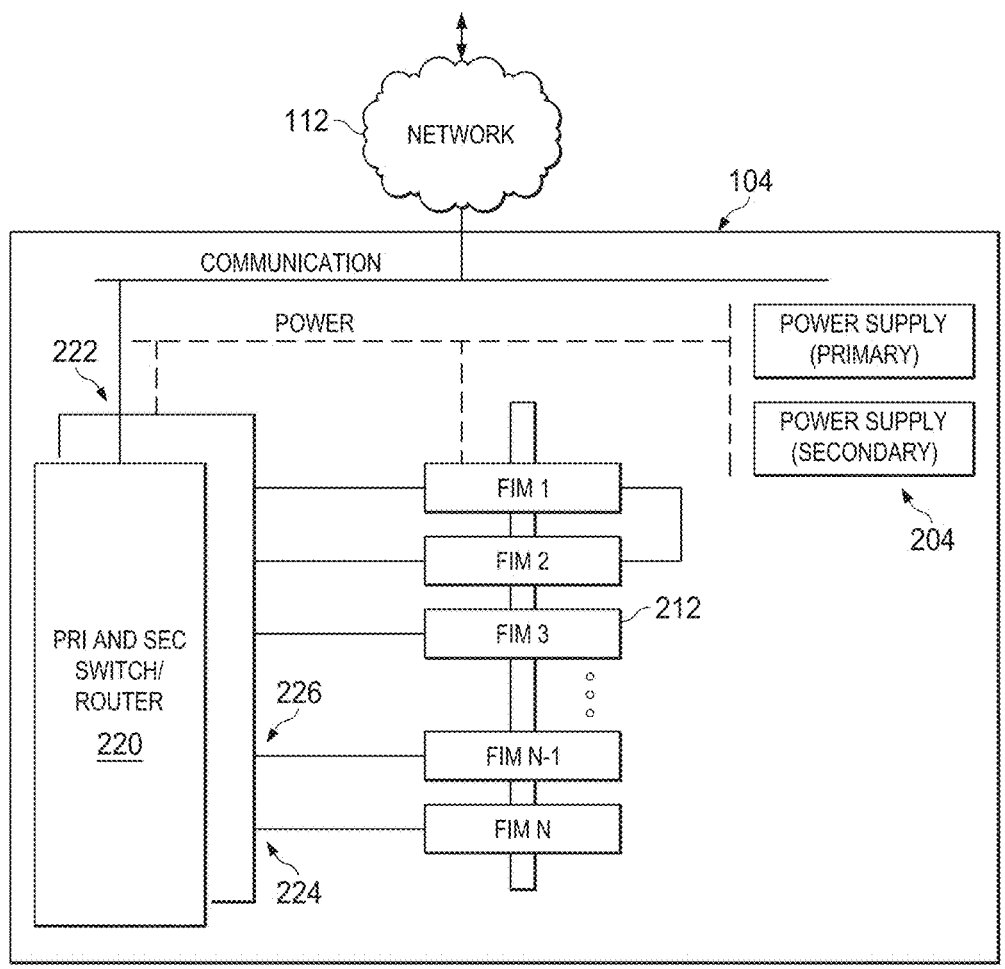

In some embodiments, the field enclosure 104 may incorporate any suitable structure such that the FIM carriers 206 can be DIN RAIL mounted, wall mounted, panel mounted, or otherwise mounted to the field enclosure 104. In contrast, as shown in FIG. 3B, the field enclosure 104 may incorporate any suitable structure such that the FIMs 212 can be DIN RAIL mounted, wall mounted, panel mounted, or otherwise mounted directly to the field enclosure 104 without the use of FIM carriers 206. Again, the signal lines 226 could be made through physical cables.

Although FIGS. 2A through 3B illustrate examples of field enclosures 104 for use in a control system, various changes may be made to FIGS. 2A through 3B. For example, each field enclosure 104 could include any number of each component. Also, while the use of redundant components has been illustrated, the use of non-redundant components could also be supported in a field enclosure, such as for non-critical or less expensive applications.

Figure 4:
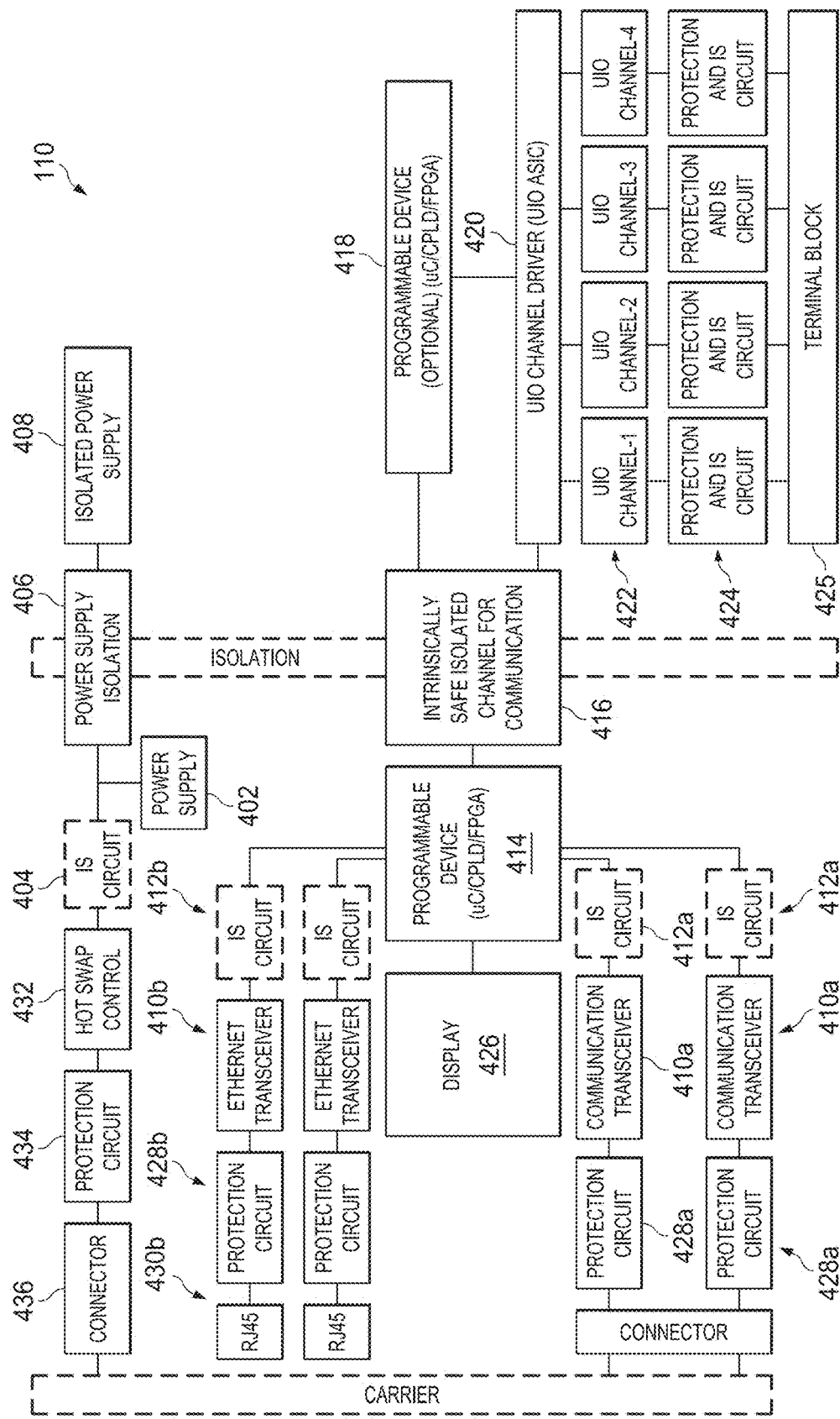
FIG. 4 illustrates an example field installable module (FIM) for use in a control system according to this disclosure.

FIG. 4 illustrates an example FIM 110 for use in a control system according to this disclosure. For ease of explanation, the FIM 110 may be described as operating in the system 100 of FIG. 1. However, the FIM 110 could be used in any other suitable control system.

As shown in FIG. 4, the FIM 110 includes a power supply circuit 402 that includes or operates in conjunction with an IS barrier 404, a switching regulator with galvanic isolation 406, and a switching regulator 408. The power supply circuit 402 can be used to receive power via the switching regulator 406 and store the power. The IS barrier 404 denotes any circuit capable of limiting the electrical energy available for ignition. Because the FIM 110 may be located in a hazardous area, such as an area filled with volatile compounds, the IS barrier 404 is included in the FIM 110 to prevent ignition of the volatile compounds. The isolated switching regulator 406 denotes any circuit or structure for transferring power across a galvanic isolation barrier. The switching regulator 408 denotes any suitable structure capable of converting an incoming input voltage to a voltage suitable for operating the FIM 110. Although the FIM 110 is shown in FIG. 4 as being line-powered (meaning the FIM 110 receives power from an external source over a physical line), the FIM 110 may also be powered by a battery or other internal power supply only.

The FIM 110 also includes two pairs of redundant signal interfaces 410a-410b, each with redundant pairs of IS barriers 412a-412b. Each signal interface 410a converts a differential voltage signal or other signal received from other FIMs into an analog or digital signal. Each signal interface 410a also converts an analog or digital signal from a programmable device 414 into a differential voltage signal or other signal to be transmitted to other FIMs. Each signal interface 410b supports communications via Ethernet, such as communications to or from a switch or router 220 or a network 112. Each signal interface 410a-410b includes any suitable structure for transmitting and receiving data, such as a transceiver. Each signal interface 410a-410b has an associated protection circuit 428a-428b and an associated connector 430a-430b. Each protection circuit 428a-428b denotes circuitry or other structures that protect against conditions such as over-voltage. Each connector 430a-430b includes any suitable structure for coupling to a PCB, cable, or other component.

The FIM 110 further includes the programmable device 414 (such as a processor) and an optional second programmable device 418 (such as a processor), which communicate with each other across an isolation barrier 416 (such as an opto-isolator). The programmable device(s) 414 and 418 generally operate to process data and control the overall operation of the FIM 110. The programmable device(s) 414 and 418 may also perform diagnostics on the FIM 110 and/or the field devices 106 connected thereto. Such diagnostics may include testing of the single loop integrity of the FIM 110. Each of the programmable devices 414 and 418 denotes any suitable processing device, such as a central processing unit (CPU), microcontroller (uC), complex programmable logic device (CPLD), or field programmable gate array (FPGA).

An I/O channel driver 420 supports the use of multiple I/O channels 422, which support the transmission and reception of signals between the FIM 110 and multiple field devices 106. In some embodiments, the I/O channels 422 can denote UIO channels that support the use of different types of signals sent to or received from the field devices 106. In these embodiments, the I/O channels 422 could include reconfigurable circuitry that allows the same circuitry to be used to transmit or receive different types of signals. For instance, the same circuitry could be reconfigured to support analog input (AI), analog output (AO), digital input (DI), digital output (DO), and pulse accumulator input (PI) signals. Example types of reconfigurable I/O circuits are shown in U.S. Pat. Nos. 8,072,098; 8,392,626; 8,656,065; and U.S. Patent Publication No. 2015/0278144 (all of which are hereby incorporated by reference in their entirety). I/O channels that support UNIVERSAL CHANNEL TECHNOLOGY from HONEYWELL INTERNATIONAL INC.

are also suitable for use here. The I/O channel driver 420 includes any suitable circuitry that processes data and controls operation of I/O channels, such as an application specific integrated circuit (ASIC) or other processing device.

An IS barrier 424 is disposed in each path between an I/O channel 422 and a terminal block 425, which denotes a structure that is physically connected to cables, wires, or other electrical connections to the field devices 106. Each IS barrier 424 limits the electrical energy available at a field device 106 for ignition.

The FIM 110 may also include a display 426. The display 426 may represent any suitable structure capable of conveying visual information regarding a status of the FIM 110. The display 426 may include one or more light emitting diodes (LEDs), a liquid crystal display (LCD), or a LED display screen. The display device 426 also can be configured as an input device, such as a touchscreen, to accept user inputs.

The FIM 110 allows hot insertion and removal to/from a live system. To support this, the FIM 110 includes a hot swap controller 432, which is coupled to a protection circuit 434 and a connector 436. The hot swap controller 432 includes any suitable circuitry or other structures supporting hot insertion and removal of the FIM 110. The protection circuit 434 denotes circuitry or other structures that protect against conditions such as over-voltage. The connector 436 includes any suitable structure for coupling to a PCB, cable, or other component.

The FIM 110 may be configured or programmed to perform one or more functions, including I/O, control, communication, data processing, and safety functions. For example, the FIM 110 may execute control algorithms and ensure single loop integrity. The FIM 110 may perform one or more of its functions using resources of another FIM connected thereto over a network. The FIM 110 can be provided with an optional physical address in a network in order to support these or other functions.

Although FIG. 4 illustrates one example of a FIM 110 for use in a control system, various changes may be made to FIG. 4. For example, the FIM 110 could include any number of each component. Also, various components in FIG. 4 could be combined, further subdivided, rearranged, or omitted and additional components could be added according to particular needs.

Figure 5:
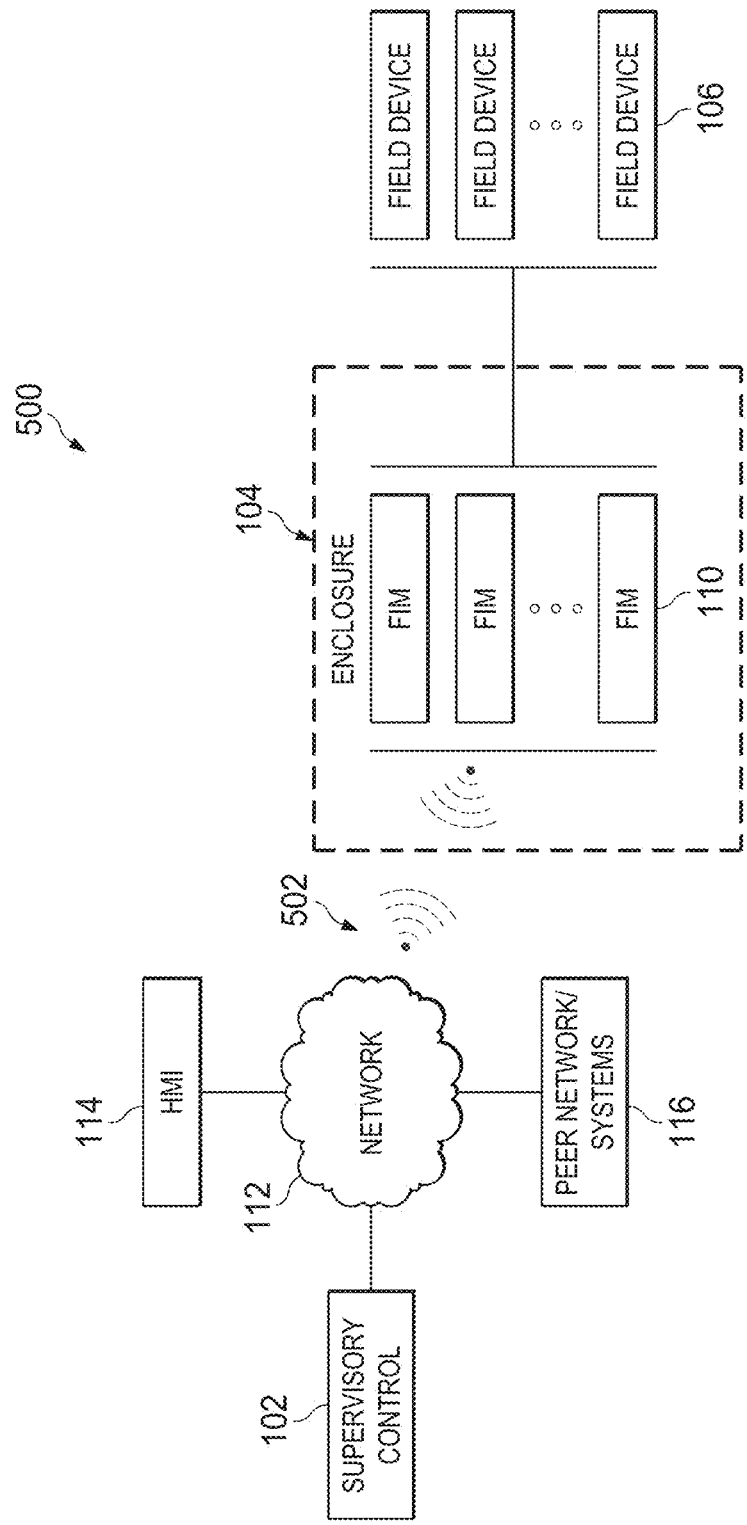
FIGS. 5 through 7 illustrate other example control systems according to this disclosure.
Figure 6:
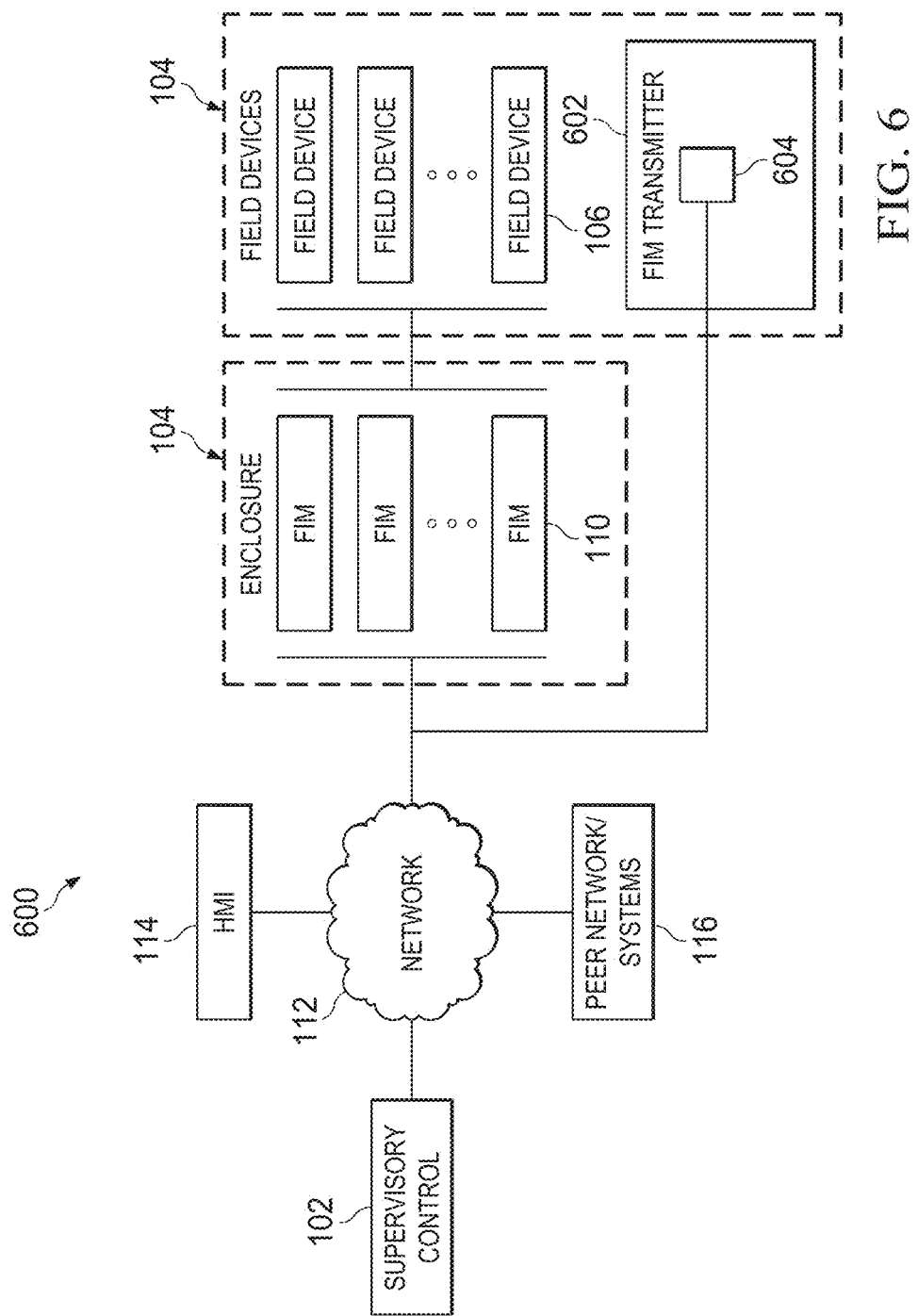
Figure 7:
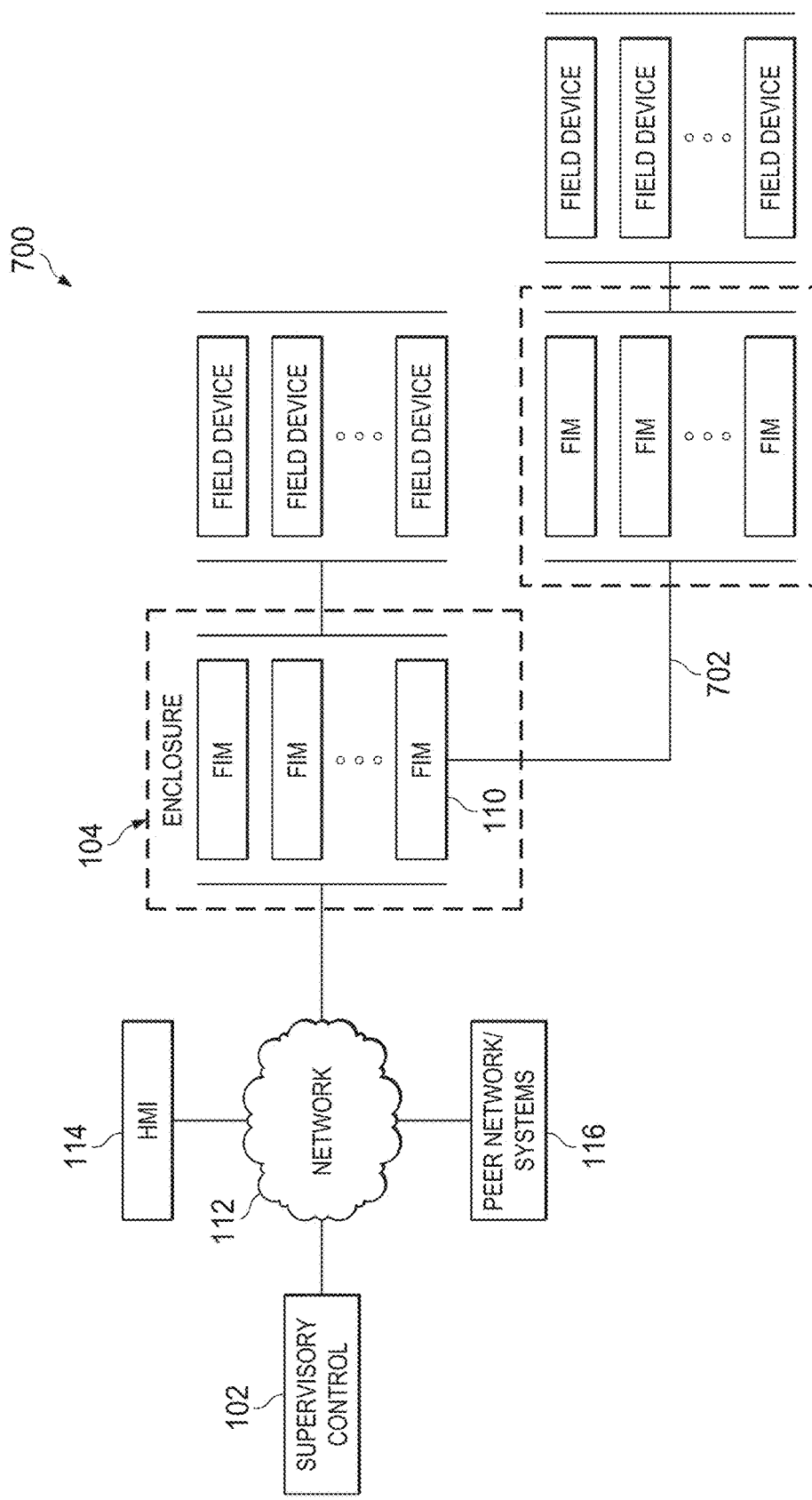

FIGS. 5 through 7 illustrate other example control systems 500, 600, 700 according to this disclosure. Each of these control systems 500, 600, 700 can be used to control at least part of an industrial plant or other industrial facility. In some embodiments, each of the control systems 500, 600, 700 is used to control field devices located in one or more hazardous areas.

As shown in FIG. 5, a FIM 110 or a field enclosure 104 may be configured as a controller capable of communicating with a computer, platform, mobile platform, or a cloud infrastructure via one or more wireless channels 502. The FIM 110 or field enclosure 104 could support any suitable wireless communication technique(s), such as WI-FI, BLUETOOTH, or near field communication (NFC). The FIM 110 or field enclosure 104 may upload/download configuration data, status information, and/or control commands using the wireless communication channel(s) 502. The FIM 110 or field enclosure 104 here may incorporate any suitable structure capable of transmitting/receiving signals wirelessly, such as a wireless transceiver.

As shown in FIG. 6, a FIM can be installed outside of a field enclosure 104. In this example, a FIM has been installed as a field transmitter 602. The field transmitter 602 may incorporate any suitable structure to measure one or more process variables, such as at least one temperature, pressure, or other sensor 604. Values of the monitored variable(s) are transmitted to a control station by the field transmitter 602, such as to alert a user to any dangerous conditions. This denotes one way in which a FIM could function as a standalone module.

As shown in FIG. 7, a FIM 110 may have one of its I/O channels coupled to or replaced with a communication channel 702. The communication channel 702 can be coupled to another FIM 110. As a result, the communication channel 702 may be used to build up a network of FIMs in a hierarchical structure to scale up the number of I/O channels.

Although FIGS. 5 through 7 illustrate other examples of control systems, various changes may be made to FIGS. 5 through 7. For example, each control system could include any number of each component. Also, industrial control and automation systems come in a wide variety of configurations. The systems shown in FIGS. 5 through 7 are meant to illustrate other example operational environments in which certain functionalities can be used. However, FIGS. 5 through 7 do not limit this disclosure to any particular configurations or operational environments.

Note that the field installable modules described above could incorporate a number of additional functions depending on the implementation. For example, in some embodiments, a FIM may be designed to support the use of secure firmware, where only firmware that is signed with a proper authentication can be downloaded to the FIM. The FIM could also support a secure boot feature to ensure that only valid firmware can run on the FIM. In some embodiments, each FIM can have its own unique digital certificate, which is used to support these features.

As another example, a FIM could support network-based configuration while providing protection against cyber-security risks. For example, the FIM could support encryption and authentication features to ensure that only authorized configuration changes are accepted by the FIM.

As yet another example, firmware in a FIM may be updated or changed without disruption of control over an underlying industrial process. For example, each FIM could support sufficient storage memory to store at least two different firmware images. New firmware may be downloaded into a storage area that is separate from the storage area containing the running firmware. After a successful download and a successful security check, the new firmware can be activated (such as by a user). The switch can be performed by the FIM in one execution cycle without disruption of control.

As a final example, a FIM can be used to migrate a legacy DCS in a "loop by loop" manner. For example, during the migration of a legacy DCS, field signals of one control loop may be switched from the legacy system to a FIM, and this can occur for each separate control loop. The legacy DCS can communicate with the FIMs using one or more existing communication protocols (like MODBUS, Ethernet/IP, or OPC) during the migration.

As noted above, a wide variety of features can be used in each FIM that is installed and used in a control system. The following denotes examples of those features, and any suitable combination of these features could be used in a FIM. In some embodiments, a FIM may be removed and inserted under power to a live system. The FIM can be designed to comply with applicable ingress protection and harsh environment settings. The FIM may communicate using IP-based Ethernet or non-IP based Ethernet over a wired or wireless medium. The FIM can support a plurality of input and output types, such as AIs, AOs, DIs, DOs, and PIs. The FIM can also support one or more field bus communication standards, such as HART, PROFIBUS, or FOUNDATION FIELDBUS. The FIM can execute one or more control algorithms, such as proportional-integral-derivative (PID) control, device control, and auxiliary control. The FIM can support one or more mounting methods, such as DIN rail mount, wall mount, and panel mount. Software or firmware instructions on the FIM can be changed without disrupting a control loop. A plant may migrate from a legacy system to a system that uses FIMs with at most one control loop off-line or migrating at a time. The FIM may include secure firmware or a protected configuration.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A device comprising:
    an enclosure suitable for outdoor use;
    multiple communication interfaces configured to send and receive data over multiple communication paths, each of the multiple communication interfaces comprising:
        at least one first interface configured to communicate over one or more first communication paths with at least one component of an industrial control system; and
        at least one second interface configured to communicate over one or more second communication paths with at least one other device that is configured to communicate with additional field devices;
    multiple input/output (I/O) channels configured to communicate with multiple field devices;
    a universal input/output (UIO) channel driver configured to process data and control operation of the I/O channels;
    an intrinsic safety barrier electrically separating the communication interfaces from the UIO channel driver and the I/O channels; and
    at least one processing device configured to process at least some of the data and control at least one of the field devices based on the processed data,
    wherein the communication interfaces, the I/O channels, the UIO channel driver, the intrinsic safety barrier, and the at least one processing device are disposed within the enclosure, and
    wherein the device is configurable to function as a primary or secondary communication gateway in order to support redundant communication over at least one of the communication paths, the primary and secondary communication gateways are communicatively coupled to each other via a private communication path for the redundant communication.

2. The device of claim 1, wherein the at least one first interface is configured to communicate with at least one of: a supervisory process controller and a human-machine interface.

3. The device of claim 1, wherein:
    the I/O channels are reconfigurable in order to transmit or receive different types of input or output signals; and
    the different types of input or output signals comprise at least one of: an analog input, an analog output, a digital input, a digital output, and a pulse accumulator input.

4. The device of claim 1, wherein the I/O channels are configured to support one or more industrial field bus communication standards.

5. The device of claim 1, wherein the at least one processing device is configured to execute one or more control algorithms in order to process the at least some of the data and control the at least one of the field devices.

6. The device of claim 1, wherein the at least one processing device is configured to run diagnostics on the device and on the field devices.

7. The device of claim 1, further comprising:
at least one sensor configured to measure at least one variable of an industrial process.

8. The device of claim 1, wherein the at least one processing device is further configured to:
verify that firmware is signed with proper authentication; and
perform a secure boot to ensure that only valid firmware is executed by the device.

9. The device of claim 1, wherein the at least one processing device is further configured to verify that a configuration change to the device is authorized before making the configuration change.

10. The device of claim 1, wherein the at least one processing device is further configured to:
execute first firmware loaded onto the device;
download second firmware onto the device while the first firmware is being executed; and
begin executing the second firmware in one execution cycle in order to maintain control over one or more of the field devices during a firmware update.

11. A system comprising:
a controller configured to control at least part of one or more industrial processes;
at least one field device; and
a first enclosure comprising:
a first field installable module configured as a primary communication gateway that is configured to communicate with the controller over a network; and
a second field installable module configured as a secondary communication gateway to communicate with the first field installable module and to control the at least one field device;
wherein each field installable module comprises multiple communication interfaces, multiple input/output (I/O) channels, a universal input/output (UIO) channel driver, an intrinsic safety barrier, and at least one processing device disposed within a second enclosure that is suitable for outdoor use, and wherein the intrinsic safety barrier electrically separates the communication interfaces from the UIO channel driver and the I/O channels, and
wherein the at least one field device is configurable to function as the primary or secondary communication gateway in order to support redundant communication over at least one communication path, the primary and secondary communication gateways are communicatively coupled to each other via a private communication path for the redundant communication.

12. The system of claim 11, wherein the gateway is configured to communicate with the controller over an Internet Protocol (IP) based network.

13. The system of claim 11, wherein the first enclosure comprises one of: a field junction box, a marshaling cabinet, a control system cabinet, a remote equipment enclosure, or an intrinsic safe cabinet.

14. The system of claim 11, wherein:
the first field installable module is configured as a primary gateway; and the second field installable module is configurable as a secondary gateway.

15. The system of claim 11, wherein the first field installable module is configured to function as a communication gateway between the second field installable module and an external network.

16. The system of claim 11, wherein the first field installable module and the second field installable module are configured to be interfaced with each other in a hierarchical structure.

17. The system of claim 11, wherein each field installable module is further configured to:
verify that firmware is signed with proper authentication; and
perform a secure boot to ensure that only valid firmware is executed by the field installable module.

18. The system of claim 11, wherein each field installable module is further configured to verify that a configuration change to the field installable module is authorized before making the configuration change.

19. The system of claim 11, wherein each field installable module is further configured to:
execute first firmware loaded onto the field installable module;
download second firmware onto the field installable module while the first firmware is being executed; and
begin executing the second firmware in one execution cycle in order to maintain control over the at least one field device during a firmware update.

20. A method comprising:
communicating with multiple field devices associated with an industrial control system using multiple input/output (I/O) channels of a first field installable module as a primary communication gateway;
communicating with a supervisory process controller or a human-machine interface using a first communication interface of the first field installable module;
communicating with a second field installable module as a secondary communication gateway, using at least one of the first communication interface and a second communication interface of the first field installable module;
controlling at least one of the field devices based on data received over at least one of the communication interfaces;
controlling operation of the I/O channels using a universal input/output (UIO) channel driver; and
electrically separating the first and second communication interfaces from the UIO channel driver and the I/O channels using an intrinsic safety barrier, and
configuring the at least one of the field devices to function as the primary or secondary communication gateway in order to support redundant communication over at least one of the communication paths, the primary and secondary communication gateways are communicatively coupled to each other via a private communication path for the redundant communication,
wherein the first and second communication interfaces, the I/O channels, the UIO channel driver, and the intrinsic safety barrier are disposed within an enclosure of the first field installable module, wherein the enclosure is suitable for outdoor use.

21. The device of claim 1, further comprising:
at least one second intrinsic safety barrier disposed between the I/O channels and a terminal block comprising multiple physical connection points for the multiple field devices.

* * * * *